United States Patent Office 3,338,708
Patented Aug. 29, 1967

3,338,708
PRODUCTION OF ALUMINUM
Gohei Marukawa, Tadahisa Shiba, and Fusao Iso, Ohta-ku, Tokyo, Japan, assignors to Showa Denko Kabushiki Kaisha, Tokyo, Japan, a corporation of Japan
No Drawing. Filed Feb. 3, 1965, Ser. No. 430,173
Claims priority, application Japan, Feb. 11, 1964,
39/6,884, 39/6,885
14 Claims. (Cl. 75—68)

ABSTRACT OF THE DISCLOSURE

A process for producing aluminum by thermally decomposing aluminum monoxycarbide by heating such material to a temperature of at least 2050° C. Alternatively, the aluminum monoxycarbide can be produced in situ by heating together alumina, carbon or aluminum carbide and a nitride with further heating to at least 2050° C. to decompose the aluminum monoxycarbide with recovery of the produced aluminum.

---

This invention relates to the production of aluminum by the thermal decomposition of aluminum monoxycarbide. More particularly, the invention relates to a process for producing aluminum by heating a mixture of alumina and either carbon or aluminum carbide in the presence of a small amount of a nitride to form aluminum monoxycarbide and thereafter heating this to a still higher temperature to thermally decompose said aluminum monoxycarbide, i.e., if stated more simply, to a process of producing aluminum by reducing alumina with either carbon or aluminum carbide in the presence of a nitride.

As a process for producing aluminum, the art of reducing alumina with carbon or carbides has been known heretofore from U.S. Patents 2,829,961 and 2,974,032. Briefly stated, the procedures are as follows. Namely, in the process of the former patent, alumina is reduced and aluminum is produced by heating a mixture of 85–80 parts by weight of alumina and 15–20 parts by weight of carbon (or aluminum carbide in an amount corresponding thereto) to 1980–2100° C. In this case, a molten mass of aluminum tetraoxycarbide ($Al_4O_4C$) and aluminum carbide ($Al_4C_3$) are formed during the reaction process and then these two react further to form aluminum. The reaction mechanism is in accordance with the following Equations 1, 2 and 3.

(1) $12Al_2O_3 + 36C \rightarrow 4Al_2O_3 + 4Al_4C_3 + 24CO\uparrow$
(2) $4Al_2O_3 + 4Al_4C_3 \rightarrow 3Al_4O_4C + 3Al_4C_3$
(3) $3Al_4O_4C + 3Al_4C_3 \rightarrow 24Al + 12CO\uparrow$ On the other hand, in the process of the latter patent, aluminum is produced by heating and reacting a mixture of 75–65 parts by weight of alumina and 25–35 parts by weight of carbon at 2400–2500° C., a still higher temperature than in the former case. In the latter case, the mechanism by which aluminum is formed is by means of the reaction of alumina with the aluminum carbide formed by heating and is represented by the following Formulas 4 and 5:

(4) $2Al_2O_3 + 9C \rightarrow Al_4C_3 + 6CO\uparrow$
(5) $Al_2O_3 + Al_4C_3 \rightarrow 6Al + 3CO\uparrow$ Although the aforementioned two processes are, as the direct reduction process of alumina by means of carbonaceous materials, typical of those developed in recent years, commercially both are still beset with difficulties such as noted below. Namely, in the case of the former, the aluminum tetraoxycarbide formed during the reaction process possesses exceedingly great volatility at elevated temperatures of particularly above 1800° C., and hence it possess a serious defect that because the loss due to volatility during operation is excessive, not only is it not possible to obtain stable commercial production but also the product cannot be obtained in good yield. On the other hand, in the latter process the use, as an intermediate, of this troublesome aluminum tetraoxycarbide is avoided and recourse is had to the reaction mechanism of hereinbefore mentioned Equations 4 and 5. As a result, it resorts to such means as increasing the carbon proportion of the starting material mixture and elevating the reaction temperature. In spite of these measures, it is still not possible to avoid the formation of some aluminum tetraoxycarbide. Furthermore, the reaction velocity of Equation 5, i.e., the formation of aluminum from alumina and aluminum carbide, is low. And in order to raise this to a speed having practicality, there is the attendant disadvantage that an abnormally high temperature of as high as 2400° to 2500° C. is required. Further, there is not only the unreasonable requirement that the temperature of the material must be raised to such an elevated temperature rapidly for preventing as much as possible the formation of the aluminum tetraoxycarbide, but also that such a reaction temperature renders it difficult to carry out the reaction smoothly or operate stably because such a temperature is very close, if not identical, to the thermal decomposition temperature of aluminum carbide (2500° C.).

We engaged in extensive researches in contemplation of the establishment of a new, commercially feasible dry aluminum refining process differing from the hereinbefore described conventional processes by which will be made possible the efficient and stable operation of this process. As a result, we found that aluminum could be readily produced by the thermal decomposition of aluminum monoxycarbide and further that by a process comprising a nitride to a mixture of alumina and either carbon or aluminum carbide, heating this mixture to form aluminum monoxycarbide and therefore thermally decomposing the so formed aluminum monoxycarbide, aluminum could be readily produced.

It is therefore the object of the invention to provide a new commercially feasible dry aluminum refining process. More specifically, the object lies in providing a process for producing aluminum from aluminum monoxycarbide and from alumina via aluminum monoxycarbide.

First of all will be described the facts discovered by us and matters related thereto by which the basis was laid for perfecting the present invention.

As compounds composed of the three elements of aluminum, oxygen and carbon, the existence of aluminum tetraoxycarbide and aluminum monoxycarbide was first established and proved by the reports of Foster et al. (L. M. Foster et al., J. Am. Ceram. Soc., vol. 39, pp. 1–11, 1956). Further, it is believed that this study concerning aluminum tetraoxycarbide became the basis of the process for producing aluminum which was disclosed by the same Foster et al. in their U.S. Patent 2,829,961 (1958) mentioned hereinabove. On the other hand, with respect to aluminum monoxycarbide, Foster et al. observed its formation in an appreciable amount heating a mixture of aluminum tetraoxycarbide ($Al_4O_4C$) and aluminum carbide ($Al_4C_3$) under such condition that the heating is done for 10 hours at 1800° C. The formation of the aluminum monoxycarbide however was restricted only to those instances when nitrogen was present due to a leakage in the furnace. The product was confirmed as being a new compound having the formula $Al_2OC$ on the basis of chemical and X-ray analyses and optical refractive index. The crystal is hexagonal, with very strong reflections at 2.75 A. and 1.58 A. Further, Foster et al. report that they attempted to obtain aluminum monoxycarbide by heating a mixture of alumina and aluminum carbide to immediately below the melting point of the mixture, but without success. Further, they report that the application of still greater heat was attended with evaporation, and thus this also did not succeed.

Subsequently, Cox et al. (J. H. Cox et al., Canadian J. Chem., vol. 41, pp. 671–683, 1963) reported that as a result of studies concerning the reaction of alpha-alumina and carbon at 1300–1800° C., employing the auxiliary techniques of the equilibrium CO gas partial pressure measurement and differential thermal analysis, they found that, while the formation of aluminum monoxycarbide was observed, its rate of formation was very slow, whereas the rate of formation of aluminum tetraoxycarbide was very fast. Hence, they report that the major portion of the product is predominantly aluminum tetraoxycarbide after all, and that this reacts with carbon at still higher temperatures to form aluminum carbide.

In spite the fact that the existence of aluminum monoxycarbide has been confirmed by these reports, it is only at a temperature of 1800° C., or at most 1900° C., that its behavior is known. Its behavior and properties at above these temperatures are still, as yet, unknown. And, that its production is also very difficult is corroborated.

We however engaged in studies of the thermal property of aluminum monoxycarbide at still higher temperatures than those hitherto reported. As a result, we made a new discovery that whereas aluminum tetraoxycarbide exhibits pronounced volatility in the neighborhood of 1800–2000° C., aluminum monoxycarbide had unique properties in that it, being far stabler and maintaining its solid phase, was difficultly volatilized and that thermal decomposition thereof took place abruptly at temperatures exceeding 2050° C., and particularly above 2100° C., to form metallic aluminum. This thermal decomposition is considered to be in accordance with the following Equation 6:

(6) $Al_2OC \rightarrow 2Al + CO\uparrow$

We also found that a low nitrogen partial pressure with respect to this thermal decomposition, particularly a nitrogen partial pressure of $10^{-2}$ atmosphere had favorable effects on the reaction. A nitrogen partial pressure such as this does not require any special operative means but can be achieved by just shutting off the flow of air from the outside. If the nitrogen partial pressure is high, a side reaction which forms aluminum nitride by the aluminum monoxycarbide reacting with the nitrogen tends to occur.

As a result of further assiduous research concerning the possibility of forming aluminum monoxycarbide by a solid phase reaction of alumina with carbon (or aluminum carbide)—a feat which had not succeeded in the past—we discovered that when the reaction was carried out by adding a small amount of a nitride to the mixture of the foregoing starting materials, the formation of the unstable aluminum tetraoxycarbide could be curbed and surprisingly aluminum monoxycarbide could be formed readily and stably at a temperature above 1800° C., and then by heating this to a temperature exceeding 2050° C. thermal decomposition could be caused to take place in said aluminum monoxycarbide to readily yield metallic aluminum. Now when our experimental results with respect to the progress of the aluminum monoxycarbide reaction conducted in the presence of the aforesaid nitride are described while making comparison with the instance in which the nitride is not added, it is as follows. The progress of the reaction was followed by X-ray analysis. Namely, when to a mixture of 74 parts of alpha-alumina and 26 parts of carbon (mol ratio 1:3) was heated without adding a nitride, the reaction starts in the neighborhood of 1700° C. and the formation of $Al_4O_4C$ begins. At 1800–1850° C., the volatilization of the $Al_4O_4C$ formed becomes pronounced and when 1900–1950° C. is reached, all of the $Al_4O_4C$ has volatilized, leaving only a small amount of $Al_4C_3$. The formation of $Al_2OC$ was not observed at all in this reaction. On the other hand, when the aforesaid starting material mixture to which have been added 5 parts of aluminum nitride is heated, the situation changes completely, the beginning of the formation of $Al_2OC$ being observed in the neighborhood of 1800° C. The formation of the $Al_2OC$ becomes active at 1850–1900° C. and at a temperature ranging from 1950° and 2050° C. the amount formed of the $Al_2OC$ about equals that of theory. When, instead of the material carbon, aluminum carbide is used in a corresponding amount, substantially similar results were shown. It is presumed that the reactions of the folowing Equations 7 and 8 are promoted by the addition of the nitride.

(7) $Al_2O_3 + 3C = Al_2OC + 2CO\uparrow$
(8) $Al_2O_3 + Al_4C_3 = 3Al_2OC$

Substantially similar results were also obtained by using silicon nitride instead of aluminum nitride. Although silicon nitride is said to sublimate when it is heated to above 1900° C. alone, when, as in this process, it is present in a mixture of alumina and carbon, it was found that it retains its nitrogen component even at above 1900° C. and can manifest effects similar to those of the foregoing aluminum nitride.

The temperature measurements in these experiments were obtained by means of an optical pyrometer. However, inasmuch as it is not possible to expect very great precision in the measurement of furnace temperatures in the elevated temperature region at this state of the art, the numerical values given here have some latitude as, for example, ±40° C. Hence, it is to be understood that the temperatures given herein are readings under such conditions.

The present invention has been arrived at on the basis of the hereinbefore mentioned various discoveries, and it is a process which is characterized in that aluminum monoxycarbide is thermally decomposed to produce aluminum. Further, it is a process for producing aluminum which is characterized in that a nitride is added to a mixture of alumina with carbon or aluminum carbide, after which this mixture is heated to a temperature not exceeding 2050° C. to form aluminum monoxycarbide, and thereafter the so obtained aluminum monoxycarbide is heated to a temperature exceeding 2050° C.

The invention process is described in further detail hereinafter.

For thermally decomposing the aluminum monoxycarbide, it is heated to a temperature exceeding 2050° C., and preferably 2100–2200° C. At below 2050° C. practically no thermal decomposition takes place; whereas at above 2100° C. the composition reaction proceeds fairly rapidly and is completed within a short period of time, for example, about 30 minutes. On the other hand, if the temperature is too high, it is not only a disadvantage from the standpoint of heat economy but also undesirable since the volatization of the formed aluminum tends to occur. The volatilization, during the course of the reaction, of the aluminum formed is surprisingly small, which it is believed to be due to the fact that its vapor pressure is held down to a smaller value by the presence together of the aluminum monoxycarbide, than when the aluminum is present alone. For reducing the volatilization loss of the aluminum formed, the reaction can be stopped in a state wherein there remains a small amount of unreacted monoxycarbide, and the aluminum can be taken out conveniently as a molten mass entrained with the aluminum monoxycarbide.

Next, the instance where the start is made alumina and carbon (or aluminum carbide) will be described. Since these materials can be converted to aluminum monoxycarbide in the first stage of the reaction substantially theoretically, the mixture ratio of the starting materials can be the theoretical mixture ratio according to the previously indicated reaction Equations 7 or 8, it, of course, being permissible for one of the materials to be somewhat in excess.

In the case of alumina and carbon, the theoretical mixture ratio is 74:26 on a weight basis. When the ratio of alumina is in excess of 78% by weight, i.e., the ratio of carbon is less than 22% by weight, part of the reactants becomes semi-molten at above 2000° C., and since there is the possibility that the reaction of the interior of the mass is hindered, it is undesirable. Conversely, as the ratio of carbon becomes greater, the content in the product of aluminum carbide increases. In this case however, the aluminum carbide can be returned to the charge subsequently after the aluminum formed in thermal decomposition step has been separated. On the other hand, when alumina and aluminum carbide are used as the starting materials, the theoretical mixture ratio of alumina to aluminum carbide on a weight basis is 41.5:58.5. Preferably the reaction is carried out, ensuring that the ratio of the aluminum carbide does not become less than the theoretical ratio. Instead of using the carbon or aluminum carbide alone, they may, of course, be used as a mixture. In this case, the ratio in which the mixture is used with the alumina will be such as to conform with what has been described hereinabove with respect to these substances.

The nitride to be added to the starting material mixture is not restricted as to its class, but conveniently used are aluminum nitride and those nitrides which are thermodynamically more unstable than aluminum nitride but do not decompose at about 1000° C. Typical examples of the foregoing nitrides include aluminum nitride, silicon nitride, boron nitride, vanadium nitride, chromium nitride and calcium nitride.

Although no particular restriction is placed on the amount added of the foregoing nitrides, normally 0.1–10% by weight, based on the starting material, is used. If the amount added is insufficient, the effect of inhibiting the formation of aluminum tetraoxycarbide decreases. On the other hand, when the amount exceeds 10%, a by-product having a composition corresponding to $Al_5C_3N$ results (in the case where aluminum nitride is used as the nitride). Hence, for forming with efficiency aluminum monoxycarbide only, the amount added of the nitride is preferably held to within several percent.

It is of course preferred that the mixture of the starting material and nitride be uniform and intimate. For example, it is convenient from the operative standpoint to mix these materials throughly in their powdered state and then by pressure molding or by using a binder such as pitch to make the mixture into briquettes.

As previously indicated, the heating temperature used for the first stage, the stage for forming aluminum monoxycarbide is above 1800° C., the temperature at which it is formed, and below 2050° C., the temperature at which it decomposes, a temperature of about 1900–2000° C. being prepared. The reaction proceeds fairly fast and the formation of the monoxycarbide is completed in a short period of time, say, within 1–2 hours.

This is followed by the second stage in which the monoxycarbide is thermally decomposed by raising the temperature to a temperature exceeding 2050° C. This thermal decomposition takes place as previously described herein.

While the aluminum formed is taken out as a molten mass containing unreacted substances and nitride, a major portion of the metallic aluminum formed can be separated and obtained in high purity by pouring the molten mass into a known flux consisting, for example, of an eutectic mixture of potassium and sodium chlorides. The remainder is effectively utilized by being recycled as a part of the charge. Thus there are no wasteful losses at all. The equipment employed can also be the common electric furnace used in industry, which can withstand these reaction temperatures. Further, it is also possible to design equipment suited for continuous operation.

As hereinbefore described the process of the present invention is based on an entirely new technique and its features and merits, when summarized, are as follows:

The starting materials and the intermediate being stable compounds, as compared with those of the conventional carbon reduction process, the operation is carried out with ease. Further, the ratio in which the starting materials are mixed possess greater flexibility. There is no need for an elevated temperature, such as 2400–2500° C., as in one of the prior art processes. The yield is high, since there are practically no losses of the components during the entire course of the reaction. When these advantages are compared with the various drawbacks of the conventional processes which were mentioned hereinbefore, the merits of the present invention become all the more apparent.

The following examples are given for illustrating the invention more specifically, it being understood that these are merely in illustration and not in limitation of the invention. Unless otherwise indicated, all parts and percentages in the examples are on a weight basis. Examples 1–3 concern the formation of aluminum monoxycarbide, while Examples 4–6 concern the formation of aluminum either from aluminum monoxycarbide or from alumina via aluminum monoxycarbide.

*Example 1*

74 parts of alumina (particle size below 1 micron) of 99.9% purity, 26 parts of powdered charcoal (all passing 150 mesh) and 5 parts of aluminum nitride were mixed, following which the mixture was pressure molded into tablets 10 mm. in diameter. The molded materials were then placed in a graphite crucible whose inner wall is coated intimately with titanium carbide for avoiding the effects that the furnace wall has on the reaction. It was then heated to 1800–2000° C. for 1.5 hours, held another 0.5 hour at 2000° C. and thereafter allowed to cool. The product obtained was a greenish tinged black crystalline mass having luster. Results of X-ray analysis revealed that this substance exhibited intense diffractions at 2.75 A. and 1.58 A., which is an agreement with the $Al_2OC$ confirmed by the previously mentioned Foster et al. Results of chemical analysis showed an $Al_2OC$ content of 93% and an AlN content of 6.7%, while the yield of aluminum monoxycarbide was 97% of theory.

*Example 2*

Aluminum monoxycarbide was obtained by following the procedures described in Example 1, except that as the nitride added were used 5 parts of silicon nitride ($Si_3N_4$ of 95% purity obtained by nitriding silicon at below 1500° C.).

*Example 3*

Aluminum monoxycarbide was obtained by following the procedures described in Example 1, except that the starting material mixture used consisted of 42 parts of alumina (purity 99.9%), 58 parts of aluminum carbide ($Al_4C_3$ of 98% purity obtained by heating aluminum and powdered charcoal to 1900° C.), and 5 parts of aluminum nitride.

*Example 4*

Powdered aluminum monoxycarbide of 93% purity was kneaded with a small amount of an aqueous dextrine solution and made into briquettes 20 mm. in diameter. These briquettes were introduced into a lidded graphite vessel lined with titanium carbine for avoiding the effects 30 minutes. The resulting product was 68 parts of a yellow-greenish tinged melt which solidified upon cooling. When chemically analyzed, the composition of this product was 87% Al, the remainder being 5% $Al_4C_3$, 6% AlN and 2% of other components.

*Example 5*

Into 73 parts of finely divided alumina (purity 99.9%) were thoroughly mixed 27 parts of 150-mesh purified powdered carbon and 4 parts of 100-mesh aluminum nitride, which mixture was then pressure molded into briquettes 10–20 mm. in diameter.

These briquettes were heated for one hour at 1850–2000° C. with an electric resistance furnace in a graphite vessel lined with titanium carbide for avoiding the effects of the vessel wall on the reaction. The temperature was then raised further to 2100–2200° C. and after heating for a while at this temperature, the molten mass was taken out. The composition was 75% Al, while the remainder was 19% $Al_2OC$ and 6% AlN.

Further, by using as a flux an eutectic mixture of KCl and NaCl and pouring the foregoing molten mass thereinto to separate and collect the metallic aluminum, it was possible to collect about 90% of the aluminum formed, the purity of which was 99.7%.

*Example 6*

The flux by which Al was separated by means of Example 5 was washed with water, following which 30 parts of that consisting a collection of metallic Al, $Al_2OC$ and AlN remaining in said flux were mixed further with 50 parts of $Al_2OC$, 70 parts of aluminum carbide as the reducing agent, and 5 parts of $Si_3N_4$ as the additive. Then by treating as in Example 5, metallic aluminum was obtained.

What we claim is:

1. A process for producing aluminum which comprises thermally decomposing aluminum monoxycarbide by heating the same to a temperature exceeding 2050° C. and thereafter recovering the aluminum formed.

2. The process according to claim 1 wherein the thermal decomposition of said aluminum monoxycarbide is effected at between 2100° and 2200° C.

3. A process for producing aluminum which comprises heating to between 1800° and 2050° C. a mixture consisting essentially of (a) alumina, (b) at least one member selected from the group consisting of carbon and aluminum carbide, and (c) a small quantity of a nitride to form aluminum monoxycarbide, heating said aluminum monoxycarbide to a temperature exceeding 2050° C. to effect the thermal decomposition thereof, and thereafter recovering the aluminum formed.

4. The process according to claim 3 wherein said nitride is aluminum nitride.

5. The process according to claim 3 wherein said nitride is silicon nitride.

6. A process of producing aluminum which comprises adding 0.1–10 parts by weight of at least one nitride to 100 parts of a mixture consisting essentially of not more than 78 parts by weight of alumina and at least 22% by weight of carbon, heating this mixture to between 1800° and 2050° C. to form aluminum monoxycarbide, heating said aluminum monoxycarbide to a temperature exceeding 2050° C. to effect the thermal decomposition thereof, and thereafter recovering the aluminum formed.

7. The process according to claim 6 wherein said nitride is aluminum nitride.

8. The process according to claim 6 wherein said nitride is silicon nitride.

9. A process for producing aluminum which comprises adding 0.1–10 parts by weight of at least one nitride to 100 parts by weight of a mixture consisting essentially of not more than 41.5% by weight of alumina and at least 58.5% by weight of aluminum carbide, heating this mixture to between 1800° and 2050° C. to form aluminum monoxycarbide, followed by heating said alminum monoxycarbide to a temperature exceeding 2050° C. to effect the thermal decomposition thereof, and thereafter recovering the aluminum formed.

10. The process according to claim 9 wherein said nitride is aluminum nitride.

11. The process according to claim 9 wherein said nitride is silicon nitride.

12. A process for producing aluminum monoxycarbide which comprises heating to between 1800° and 2050° C. a mixture consisting essentially of (a) alumina, (b) at least one member selected from the group consisting of carbon and aluminum carbide, and (c) a small quantity of a nitride.

13. The process according to claim 12 wherein said nitride is aluminum nitride.

14. The process according to claim 12 wherein said nitride is silicon nitride.

References Cited

Foster, L. M., et al.: Reactions Between Aluminum Oxide and Carbon, the $Al_2O_3$–$Al_4C_3$ Phase Diagram, Jour. Amer. Ceram. Soc., vol. 39, No. 1.

DAVID L. RECK, *Primary Examiner.*

N. P. BULLOCH, *Examiner.*